(12) United States Patent
Ullmann et al.

(10) Patent No.: US 6,677,965 B1
(45) Date of Patent: Jan. 13, 2004

(54) RUBBER BAND GRAPHICAL USER INTERFACE CONTROL

(75) Inventors: Cristi N. Ullmann, Austin, TX (US); Allen C. Wynn, Round Rock, TX (US); Michael W. Brown, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 09/615,771

(22) Filed: Jul. 13, 2000

(51) Int. Cl.$^7$ ................................ G09G 5/00
(52) U.S. Cl. ..................... 345/786; 345/787
(58) Field of Search ................ 345/684, 688, 345/784–787, 830, 973

(56) References Cited

U.S. PATENT DOCUMENTS

| | | | | |
|---|---|---|---|---|
| 5,495,566 A | * | 2/1996 | Kwatinetz | 345/785 |
| 5,508,717 A | * | 4/1996 | Miller | 345/858 |
| 5,615,367 A | * | 3/1997 | Bennett et al. | 707/102 |
| 5,634,095 A | * | 5/1997 | Wang et al. | 345/763 |
| 5,664,128 A | * | 9/1997 | Bauer | 345/708 |
| 5,721,847 A | | 2/1998 | Johnson | 395/333 |
| 5,790,115 A | | 8/1998 | Pleyer et al. | 345/327 |
| 5,838,326 A | * | 11/1998 | Card et al. | 345/775 |
| 5,861,906 A | * | 1/1999 | Dunn et al. | 725/87 |
| 5,963,191 A | * | 10/1999 | Jaaskelainen, Jr. | 345/856 |
| 6,075,531 A | * | 6/2000 | DeStefano | 345/788 |
| 6,104,400 A | * | 8/2000 | Halachmi et al. | 345/854 |
| 6,282,547 B1 | * | 8/2001 | Hirsch | 707/102 |
| 6,480,211 B1 | * | 11/2002 | Masri | 345/857 |
| 6,483,509 B1 | * | 11/2002 | Rabenhorst | 345/442 |

OTHER PUBLICATIONS

Screen Dumps of Microsoft Publisher (pp. 1–4, 1999).*

* cited by examiner

Primary Examiner—Kristine Kincaid
Assistant Examiner—Le Nguyen
(74) Attorney, Agent, or Firm—Robert H. Frantz; David A. Mims, Jr.

(57) ABSTRACT

A rubber band variable-rate GUI control for use in conjunction with GUI controls, such as sliders, scroll bars, virtual joysticks, and oppositional buttons (up/down, left/right, plus/minus, next/previous, etc.). A user may place a pointer or cursor over a GUI control, select (e.g. click and hold a mouse button) and drag away from the control, and a virtual rubber band extending between the pointer and the GUI control is displayed. The further the user moves or "pulls" the pointer from the GUI control, the thinner and more elyptical the rubber band is displayed, and the faster the selections scrolls or the control operation is repeated. When the user moves the pointer closer to GUI control, the rubber band is displayed fatter and more circular in shape, and the scrolling or control operation repetition slows.

30 Claims, 6 Drawing Sheets

RUBBER BAND GRAPHICAL USER INTERFACE CONTROL

CROSS-REFERENCE TO RELATED APPLICATIONS

This application is related to U.S. application Ser. No. 09/578,748, filed on May 25, 2000, by Cristi Ullmann, et al.; and to U.S. application Ser. No. 09/579,257, filed on May 25, 2000, by Allen Wynn, et al.; and to U.S. application Ser. No. 09/578,749, filed on May 25, 2000, by Allen Wynn, et al.; all of which are commonly assigned.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

The related applications, all filed on May 25, 2000, now Ser. Nos. 09/578,748; 09/578,749; 09/579,257 by Cristi Ullmann, et al.; Allen Wynn, et al; and Allen Wynn, et al., respectively, are incorporated herein by reference in their entirety, including drawings, and hereby are made a part of this application.

BACKGROUND OF THE INVENTION

1. Field of the Invention

This invention relates to the arts of graphical user interface controls provided on computer displays, and to related displays such as personal digital assistants ("PDA") and wireless communications devices.

2. Description of the Related Art

Graphical user displays on electronic devices such as computers, personal digital assistants, and wireless communications devices are common in the art. As these devices become more and more integral to activities in the daily lives of people such as web browsing, word processing, and even making telephone calls, the efficiency and ergonomics of these interfaces are extremely important. A user will quickly notice whether one user interface is easier and quicker to use than another based upon the number of operations required to perform a certain task. Further, the level of "intuitiveness" implemented in the user interface can greatly increase the usefulness and speed with which the user can operate the device.

Many graphical user interfaces follow the same conventions for navigation of and selection of controls on the user interface. Such common graphical user interfaces ("GUI") include windows or frames-type displays in Microsoft's Windows operating system, UNIX operating system, IBM's OS/2 and AIX operating systems, Microsoft's Windows CE operating system, Apple Computer's operating system, and many "proprietary" windows-like GUI's on various devices such as PDA's, cell phones, electronic organizers, etc.

FIG. 1 shows the basic organization of many prior art computer systems and computer-based devices. The system (10) typically includes a microprocessor or central processor unit ("CPU") including computer memory, and may also include interfaces (15) to hard disks and removable disk media (14), and possibly interfaces to computer or communications networks (11) such as a network interface card ("NIC") (17) or wireless communications interface. Commonly used NICs include EtherNet local area network ("LAN") cards, dial-up modem cards, and wireless communications circuits. Some of these circuits may be provided integral to the device (10), such as the case with web-enabled cell phones, or may be available as add-in circuits such as PCI cards or PCMCIA cards for personal computers.

Additional typical hardware provided in the system (10) includes a group of user input/output ("I/O") (16) devices (13), such as a display, keyboard, and/or pointing device, accompanied by common user I/O interface circuits to allow the CPU and system software to access and use the user I/O devices (13). Common display devices include VGA and LCD monitors for personal computers, and LCD panels for PDA and cell phones. Common pointing devices include "arrow keys", "tab" keys, mouse and scroll-mouse, joystick, track balls, glide point touch sensitive pads, and touch sensitive displays with stylus pens. Some devices, such as certain PDA's, do not include an actual keyboard, but rather rely upon a touch-sensitive LCD display with virtual pointing device and stylus.

The software functionality of computer-based systems (10) can be divided into low-level device drivers and BIOS (18), an operating system (103), and applications programs. Low-level device drivers provide hardware-specific interface functions which allow the operating system and application programs to access the system hardware through common or generic application program interfaces ("API"). Some device drivers include necessary communications protocols and methods associated with a particular hardware device, such as a modem or wireless communications interface. Application programs can be further divided into portable applications, or applets (101), a portable application program interpreter (19), and non-portable, system-dependent applications (102). Such division of hardware and software functionality is well-understood in the art, and can be applied to large computer systems such as an IBM AS/400 equally as well to small computer systems such as PDA's running Windows CE.

On the system display is typically shown a conventional frame or "window" of information related to a specific system function or program, such as a word processor, spreadsheet, to-do list, address book, e-mail client, or web browser. FIG. 2 shows a typical arrangement of a frame (20) including a title bar (21), tool bar (24), display area (25), and a pointer (201). The pointer (201) moves in response to the system pointing device and/or keyboard, such as typing on the arrow keys, movement of a mouse, track ball, or joystick. The title bar may include "buttons" for minimizing or restoring the frame (23), closing the program (22), as well as a display of the name of the function or program. The tool bar (24) typically includes a number of text and/or iconic options, such as "file" and "edit" drop-down lists.

The display area may be further navigable using vertical scroll (27) and horizontal scroll (26) bars, which are especially useful for system displays of information which cannot be shown completely within one frame on the display. "Clicking" on the right button (29) or left button (28), or "dragging" the horizontal position indicator (201) causes the information in the display area (25) to be panned or scrolled left or right. Likewise, using the up button (29), down button (28), or vertical position indicator (200) can cause panning or scrolling in a vertical motion. These types of scroll bars are common on word processors, spreadsheets, graphical design packages,and web browsers.

In typical operation of these types of GUI displays, the user moves the pointer (201) to a button or text option, and selects that option by clicking on it and/or dragging it. In some cases, keyboard-only navigation or selection is possible by using special combinations of keys, such as ALT-F to select the "file" drop-down menu. FIGS. 3a through 3c show a typical slider or scroll control (30), typical list control (34) with up/down choice buttons, and a virtual joystick (38) which is described in the related application. The slider control (30) typically includes a slider control button (31), and two oppositional movement buttons (32 and 33). Similar vertical slider controls are also well known in the art. The typical list control (34) includes a display of the currently selected list item (35), up/down (next/previous, etc.) choice buttons (36, 37), and may include a drop-down list of possible choices. The virtual joystick (38) includes a stick portion (39) which can be moved by selecting it with the pointer and moving the pointer control device, such as a mouse, left, right, up or down.

The article "Multistream input: An experimental study of document scrolling methods" in the IBM Systems Journal Vol. 38, No. 4, 1999, "investigates alternative methods to improve user performance for browsing World Wide Web and other documents." This investigation involved a task requiring both scrolling and pointing, and compared the following input devices: (a) standard mouse, (b) wheel mouse, (c) joystick mouse (combination Standard Mouse with a joystick), and (d) trackpoint (such as found on an IBM ThinkPad computer) with supplemental Standard Mouse.

The results of the experimental study showed that a mouse with a finger wheel did not improve a user's performance or subjective rating over a standard mouse. Indeed, the participants commented that it was tedious and tiring to repeatedly roll the wheel, although this mode was intuitive. The researchers believed that the lack of "self-centering" placed the wheel mouse at a fundamental disadvantage to do effective rate control. The results also indicated that the Joystick Mouse and the Trackpoint with supplemental Standard Mouse performed better than the Standard Mouse alone, both in terms of performance and user perception. "Self-centering" is a very useful attribute of an input device when scrolling through documents, maps, etc. In addition, there are some instances where the user may wish to scroll in a direction other than directly up, down, left or right. For example, a user may want to scroll a map at an angle towards a destination city.

In the related patent applications, a virtual joystick, an infinite spinlist and a spinlist with preview and postview lists were disclosed. All of these new GUI controls enhance the efficiency and the intuitiveness of graphical user interfaces. However, a intuitive control for rate of change is needed beyond that currently found in the art. For example, when a user is panning around a large document in framed display, only a portion of the whole document may be displayed and viewed at a time. Repeated clicking on up/down and left/right icons, grabbing a sliding of slider buttons, and grabbing a tilting of virtual joysticks do not provide intuitive interaction as one may find in the "real world" through similar viewing arrangements. An example of such a real world viewing arrangement is viewing part of a total scene through the viewfinder of a camera. When manually moved to find a particular subject in the scene, a human user will move the camera quickly until the general area of the subject is found, and will slow movement until the subject is properly centered in the view finder. To draw an analogous comparison to present day GUI controls and cameras, one can imagine a camera mounted to a motorized tripod, with the motor controls only having a single speed of up/down control and left/right control. To center a subject in the viewfinder of the camera, the user would repeatedly operate the up/down and left/right controls until the subject is centered, using a few long duration moves to find the general area of the subject, and many short "bursts" to fine position the subject. If the subject is initially far from the current view of the camera (or frame), this can take very long to pan the subject into the frame. To compensate for this, the constant panning speed may be increased, which makes it more difficult to achieve the fine positioning within the frame. In the real world, this kind of problem, such as for remotely controlled security cameras, is solved by using variable-rate panning controls, such as potentiometers, but the problem is prevalent in computer frame-based GUI environments.

Therefor, there is a need in the art for a virtual control method which allows for intuitive variable-rate control of common GUI control types. This new control method is preferably compatible with a wide range of existing GUI controls and the method of rate variation indication is easily recognizable in order to enhance the efficiency and intuitiveness of the new method.

BRIEF DESCRIPTION OF THE DRAWINGS

The following detailed description when taken in conjunction with the figures presented herein present a complete description of the present invention.

FIGS. 4a through 4e show a rubber band control applied to several GUI controls, including a slider bar, a 2-dimensional virtual joystick, and list up/down buttons.

SUMMARY OF THE INVENTION

Figure 1:
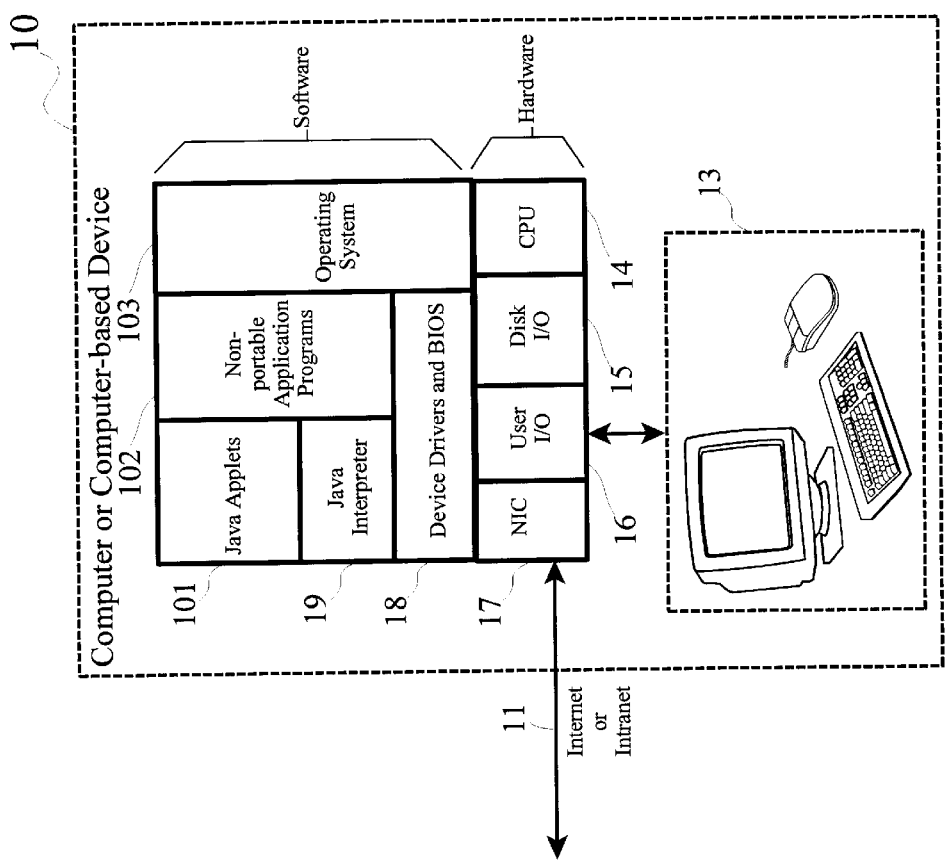
FIG. 1 shows the prior art arrangement of computers and computer-based devices with graphical user interfaces.
Figure 2:
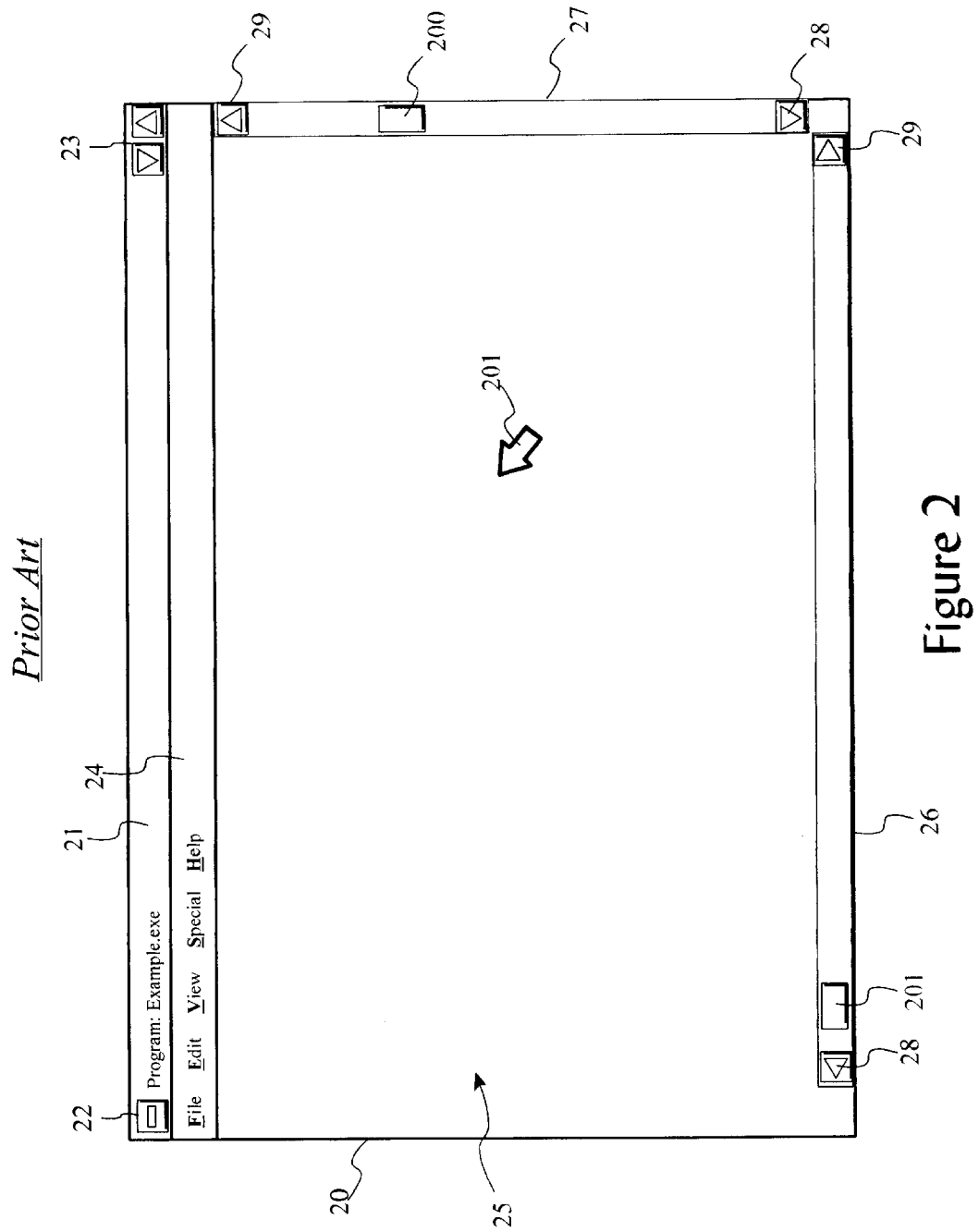
FIG. 2 presents an example GUI frame.
Figure 3B:
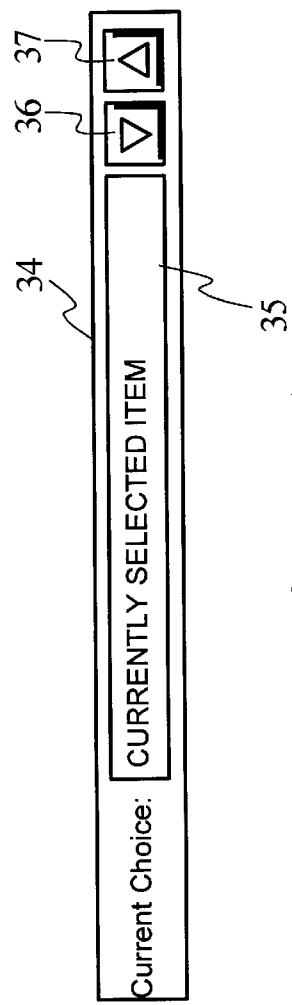
FIGS. 3a through 3c illustrates several GUI controls, including a slider bar, a 2-dimensional virtual joystick, and list up/down buttons.
Figure 3C:
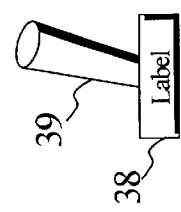
Figure 3A:
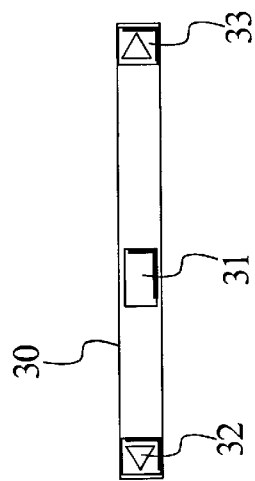

The rubber band variable-rate GUI control is used in conjunction with existing GUI controls, such as sliders, scroll bars, virtual joysticks, and oppositional buttons (up/down, left/right, plus/minus, next/previous, etc.). The rubber band method allows for a user to place a pointer or cursor over a GUI control, and select (e.g. click and hold a mouse button) and drag away from the control, at which time a virtual rubber band extending between the pointer and the GUI control is displayed. The further the user moves or "pulls" the pointer from the GUI control, the thinner and more elyptical the rubber band will be displayed, and the faster the selections will scroll or the control operation will be repeated. When the user moves the pointer closer to GUI control, the rubber band will be displayed fatter and more circular in shape, and the scrolling or control operation repetition will slow. If the pointer is moved past the point of origin for the GUI control, the rubber band is displayed from the other side of where the pointer started and scrolling will reverse. De-selection of the control, such as by releasing a mouse button, causes the rubber band display to be removed, and operation of the GUI control is ceased. The rubber band control operation may be vertical, horizontal, or a combination of both, on the display. A new variation of a slider control, called a "fixed slider", which is enabled by the use and existence of the rubber band control is also disclosed.

DETAILED DESCRIPTION OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention is preferably realized as a user graphical interface control or dialog object integrated into a function or application program on a computer or computer-based system. The computer-based system is preferably provided with an operating system which provides common GUI control functions, such as pointer location and movement detection, event handling based upon areas on the display in which the pointer is located, and event handling of pointer selection such as mouse clicks. As such, the invention can be realized on personal computers, palm-top computers and personal digital assistants, as well as other devices incorporating graphical user displays such as cell phones and wireless web browsers.

The following disclosure sets forth the invention as a modification or enhancement to a pointer display and control in a graphical user interface, which allows it to be used and compatible with existing GUI controls. However, it will be readily recognized by those skilled in the art that the method of the invention can be directly incorporated in to each GUI control as well. The rubber band control operation may be vertical, horizontal, or a combination of both, on the display, and may include 1, 2 and 3 dimensional or variable operation.

The rubber band variable-rate GUI control is used in conjunction with existing GUI controls, such as sliders, scroll bars, virtual joysticks, and oppositional buttons (up/down, left/right, plus/minus, next/previous, etc.), and with new types of GUI controls such as a "fixed scroll button" or "fixed slider", which are made possible by the rubber band control.

Operation of the Rubber Band Control

Figure 4B:
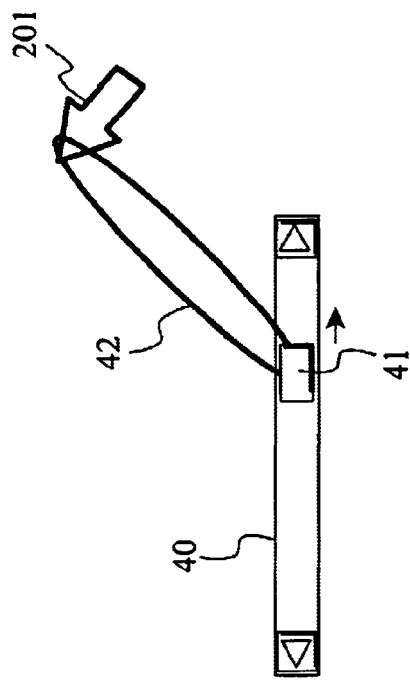
Figure 4D:
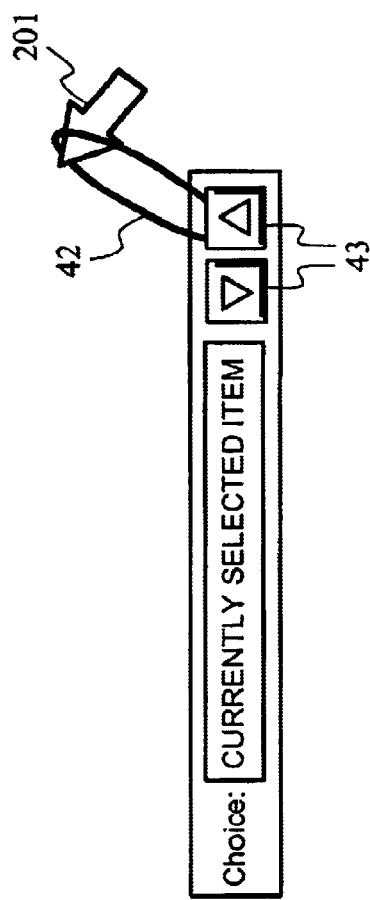
Figure 4A:
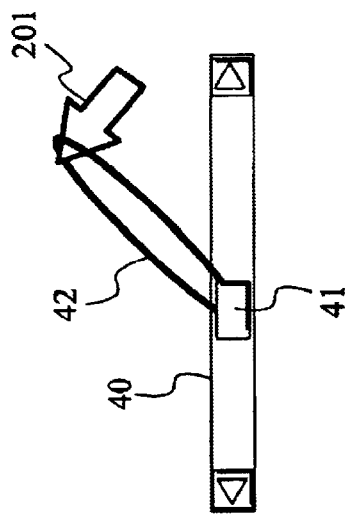
Figure 4C:
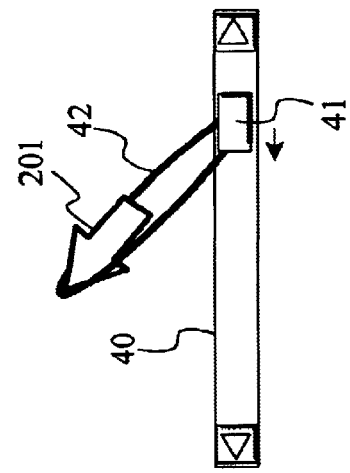

The rubber band control allows a user to place a pointer or cursor over a GUI control, and select and drag away from the control, at which time a virtual rubber band extending between the pointer and the GUI control is displayed, as shown in FIGS. 4a through 4f. FIG. 4a shows a typical horizontal slider or scroll control (40) with the rubber band display (42) between the pointer (201) and the scroll button (41). The further the user moves or "pulls" the pointer (201) from the GUI control, the thinner and more elyptical in shape the rubber band will be displayed, and the faster the selections will scroll or the control operation will be repeated, as shown in FIG. 4b. When the user moves the pointer closer to GUI control, the rubber band will be displayed fatter and more round in shape, and the scrolling or control operation repetition will slow. If the pointer is moved pass the point of origin for the GUI control, the rubber band is displayed from the other side of where the pointer started and scrolling will reverse, as shown in FIG. 4c. The the control is de-selected, such as by releasing the mouse button or lifting a touch-screen stylus, the rubber band display is removed and operation of the control is ceased.

FIG. 4d illustrates how the rubber band control can be applied to a list control with up/down buttons (43), which pulling the rubber band further from either the up or down buttons would cause faster sequencing through the list choices. FIG. 4e shows use of the rubber band on a virtual joystick (44, 45), which was described in the related application, to allow rate control of the joystick in one or two variables.

Figure 5:
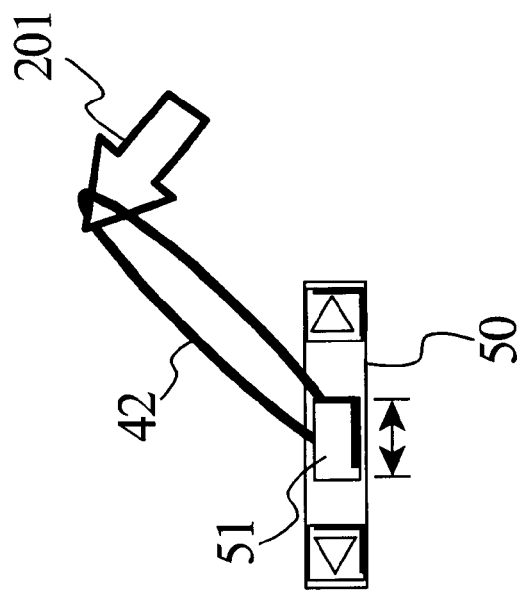
FIG. 5 illustrates a new type of GUI control, a "fixed slider", usable with the new rubber band control.
Figure 4C:
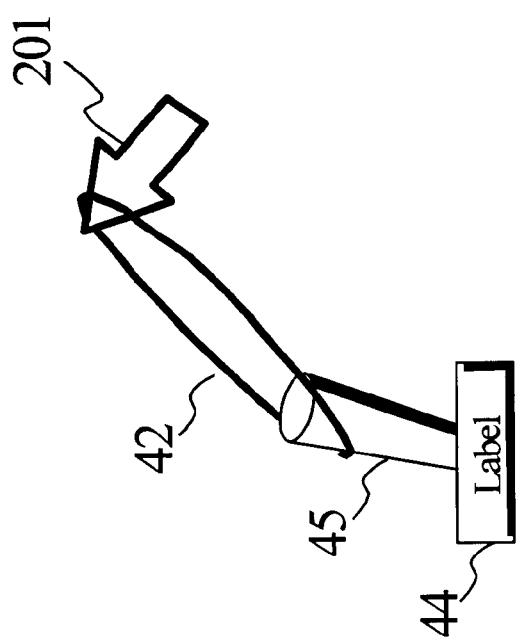

In FIG. 5, a new type of control not previously possible but enabled by the rubber band control is shown. While this control (50) has a basic appearance of a scroll or slider control, the center button (51) is "pinned" or fixed at the center of the control. Clicking on it (or otherwise selecting it) and "stretching" the rubber band (42) causes it to operate in either direction at varying rates depending on the distance drawn between the pointer and the center button (51). The user scrolls by "tugging" the scroll button. The remainder of the control (up/down arrows at end, and empty portions of scroll bar) function exactly like a normal scroll-bar. This can of course be applied to a vertical scroll bar or control, as well. As disclosed previously, de-selection of the control causes the rubber band display to be removed and operation of the control to stop.

Rubber Band Software Control

Figure 6:
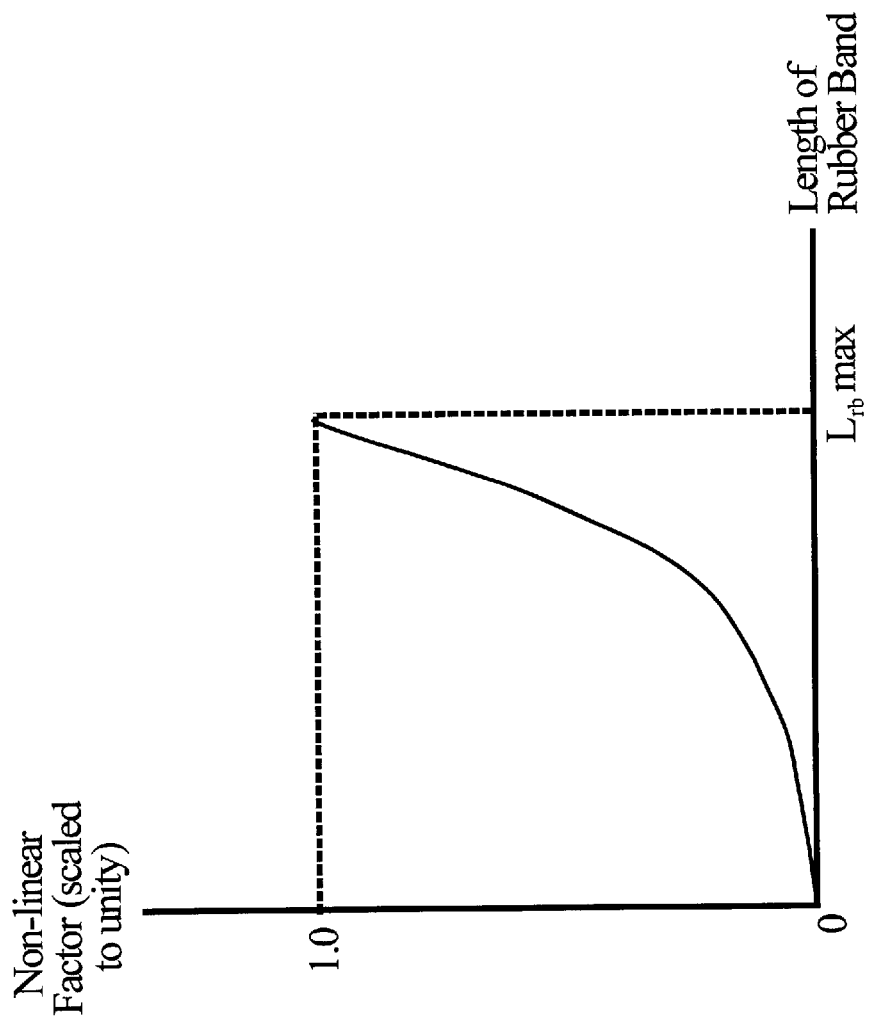
FIG. 6 shows an sample nonlinear function for use in determining the nonlinear response to the position of the joystick.

The result of the stretching of the rubber band between the pointer and the control can be a linear or nonlinear relationship to the distance between the pointer and the control. For example, for each unit of distance increase between the pointer and the control (the length of the rubber band), a unit of rate change can be increased, for a linear relationship. For a nonlinear relationship, each unit increase in the distance between the pointer and the control (the length of the rubber band) and cause increasingly more rate change. FIG. 6 shows an example nonlinear function for possible use in implementing a nonlinear rubber band control.

In the preferred embodiment, the rubber band control is implemented as a "control of a control". In other words, instead of the pointer directly operating a GUI control, such as a slider control button, the rubber band control will operate the control. So, the rubber band control software is activated when the pointer is moved in the vicinity of the GUI control and when the GUI control button has been selected. As the user moves the pointer, the rubber band control software receives pointer control status, such as mouse location, movement and mouse button states. The rubber band control software then processes the pointer control device data, and outputs data directly to the GUI control software to emulate normal inputs from the mouse. TABLE 1 shows the pseudocode to realize this control flow, which can be implemented by those skilled in the art using any appropriate programming language and methodology suitable for the computing platform target, such as "C", "C++", Microsoft Windows CE, or Java.

TABLE 1

Rubber Band Control Pseudocode

While pointer has selected control
    get position of pointer "ptr_pos"
    get position of control "ctl_pos"
    calculate distance D between pointer and control
    wait_time = function of distance D
    band_thick = function of distance D
    band_shape = function of distance D
    draw rubber band with thickness and shape from ptr_pos to ctl_pos
    operate the targeted control one time (i.e. emulate a click on the control)

TABLE 1-continued

Rubber Band Control Pseudocode wait for wait_time
End While

In the pseudocode of TABLE 1, the control software retrieves the current pointer position and control button positions, either through a function call to the operating system, passing in of variables, or accessing global variables. Many systems will represent these positions as x-y coordinates, often in units of pixels or PELS, either in absolute terms (from a fixed point on the display) or frame-relative terms (from a fixed point in the frame).

The distance between the pointer and the control button can be found simply by applying the Pythagorean theorem between the x-y coordinates of the pointer and the x-y coordinates of the control button, by calculating the square root of the sum of the squared difference in the x positions and the squared difference in the y positions, otherwise known as the Pythagorean theorem:

$$D = SQRT\{(x_{pointer} - x_{control\_button})^2 + (y_{pointer} - y_{control\_button})^2\}$$

Then, this distance value can be used to determine the display thickness and amount of elyptical shape of the rubber band, and the time to wait for the next position update and control operation. TABLE 2 shows an example to determine the rubber band thickness, which can be easily implemented as a look up table or code function. It allows a number of distance ranges, delimited by $C_i$ constants, to set several discrete values of the thickness $T_i$ of the rubber band displayed. "Roundness" of the shape of the rubber band can be indexed to $T_i$ or determined by an alternate function or table.

TABLE 2

Rubber Band Thickness

| Distance (pel) | Thickness (pel) |
| --- | --- |
| $0 < D \leq C_1$ | $T_1$ |
| $C_2 < D \leq C_3$ | $T_2$ |
| $C_3 < D \leq C_4$ | $T_3$ |
| ... | ... |
| $C_{max-1} < D \leq C_{max}$ | $T_{max}$ |

TABLE 3 shows an example function with both linear and nonlinear (in this case accelerating) response to the wait time based upon distance, which can also be implemented in a variety of manners, such as a look up table or software function. In the example of TABLE 3, $W_{std}$ is a standard wait value. For a linear relationship, the time waited between each successive loop through the code and operation of the control is inversely proportional to the distance between the pointer and the control. Thus, the greater the distance, the faster the operation of the control. For a nonlinear response, any appropriate function or table of data can be used, such as the inverse hyperbolic relationship shown in TABLE 3.

TABLE 3

Wait Time

| Distance (pel) | Linear Wait (msec) | Nonlinear Wait (msec) |
| --- | --- | --- |
| $0 < D \leq C_1$ | $W_{std}/C_1$ | $W_{std}/D^2$ |
| $C_2 < D \leq C_3$ | $W_{std}/C_2$ | $W_{std}/D^2$ |
| $C_3 < D \leq C_4$ | $W_{std}/C_3$ | $W_{std}/D^2$ |
| ... | ... | ... |
| $C_{max-1} < D \leq C_{max}$ | $W_{std}/C_{max}$ | $W_{std}/D^2$ |

Finally, in the code of TABLE 1, the actual control is operated once, such as emulating a click on the up, down, left or right button, by the rubber band control code, thus causing one step of action on the targeted GUI control. Then, the wait is executed, and the loop is repeated if the control is still selected.

New Types of Controls Enabled by the Rubber Band Control

Whereas prior art GUI controls are defined based upon the need to display movement of the control, the advent of the rubber band display and control allows definition of new controls which do not themselves move. Such as control is a "fixed scroll bar", as shown in FIG. 5. This control operates and appears much the same as a normal scroll bar, with operable left and right buttons. But, the center button (51) does not move and is "pinned" in place. Pulling or tugging on the center button with the rubber band control would operate the scrolling action as if the button were actually moving. This allows the scroll control to be displayed in much less display space, while it is intuitively obvious to a user how to operate it. Conservation of display space is increasing important as the display space available on miniaturized computer-based devices such as PDAs and cell phones is very limited, and as full-size GUI computer displays become more crowded with control and short cut icons.

Summary

The rubber band GUI control element as disclosed provides enhanced control of GUI-based computer applications. One primary advantage is that it can be used in conjunction with existing GUI controls to give improved, variable rate operation of those controls. Another advantage is that it allows definition of new types of immovable GUI controls which conserve display space. It will be understood from the foregoing description that various modifications and changes may be made in the preferred embodiment of the present invention without departing from its true spirit, such as the use of alternate programming methodologies or languages, alternate computer platforms and software, operating systems and user control objects. It is intended that this description is for purposes of illustration only and should not be construed in a limiting sense. The scope of this invention should be limited only by the language of the following claims.

What is claimed is:

1. A method for interfacing with a user of a computer system having a graphical user display, the method comprising the steps of:

(a) controlling a pointer element on the graphical user display with a user pointer controller, the pointer controller having position and selection status responsive to operation by a user;

(b) displaying on said graphical user display a control icon having one or more action areas, said action areas comprising at least one forward action area or one backward action area;

(c) monitoring said position and selection status of said pointer controller to detect if one of said action areas has been selected by said user;

(d) altering the appearance of said control icon and said pointer to visually indicate the selection of said action area by displaying a virtual rubber band on said graphical user display, said virtual rubber band encircling said action area and said pointer element; and (e) allowing repetitive operation of said action area while said selection is detected by autonomously repeatedly periodically generating a signal to said computer system indicative of a selection made by said user of said control icon action area.

2. The method of claim 1, wherein said forward action area is presented as a button.

3. The method of claim 1, wherein said backward action area is presented as a button.

4. The method of claim 1, wherein said action areas comprise a slider action area.

5. The method of claim 4, wherein said backward action area is presented as a scroll bar control button.

6. The method of claim 1, wherein said action areas comprise a virtual joystick action area.

7. The method of claim 1, wherein said periodic generation of a signal to the computer system further comprises modifying the rate of periodic generation of a signal relative to a determined distance between the pointer element and the control icon.

8. The method of claim 1, wherein said periodic generation of a signal to the computer system further comprises modifying the apparent thickness of the virtual rubber band relative to a determined distance between the pointer element and the control icon.

9. The method of claim 1, wherein said periodic generation of a signal to the computer system further comprises modifying the apparent oval shape of the virtual rubber band relative to a determined distance between the pointer element and the control icon.

10. The method of claim 1, wherein said step of displaying on said graphical user display a control icon further comprises displaying a slider bar control icon having two oppositional action areas and a virtual slider button, said virtual slider button being fixed in place and operable by said virtual rubber band.

11. A computer-readable storage medium having stored therein computer-readable program code for interfacing with a user of a computer system, the computer system having a graphical user display and a processor, wherein the program code when executed by the processor causes the processor to perform the steps of:

(a) controlling a pointer element on the graphical user display with a user pointer controller, the pointer controller having position and selection status responsive to operation by a user;

(b) displaying on said graphical user display a control icon having one or more action areas, said action areas comprising at least one forward action area or one backward action area;

(c) monitoring said position and selection status of said pointer controller to detect if one of said action areas has been selected by said user;

(d) altering the appearance of said control icon and said pointer to visually indicate the selection of said action area by displaying a virtual rubber band on said graphical user display, said virtual rubber band encircling said action area and said pointer element; and (e) allowing repetitive operation of said action area while said selection is detected by autonomously repeatedly periodically generating a signal to said computer system indicative of a selection made by said user of said control icon action area.

12. The computer-readable storage medium of claim 11, wherein said forward action area is presented as a button.

13. The computer-readable storage medium of claim 11, wherein said backward action area is presented as a button.

14. The computer-readable storage medium of claim 11, wherein said action areas comprise a slider action area.

15. The computer-readable storage medium of claim 14, wherein said backward action area is presented as a scroll bar control button.

16. The computer-readable storage medium of claim 11, wherein said action areas comprise a virtual joystick action area.

17. The computer-readable storage medium of claim 11, wherein said periodic generation of a signal to the computer system further comprises modifying the rate of periodic generation of a signal relative to a determined distance between the pointer element and the control icon.

18. The computer-readable storage medium of claim 11, wherein said periodic generation of a signal to the computer system further comprises modifying the apparent thickness of the virtual rubber band relative to a determined distance between the pointer element and the control icon.

19. The computer-readable storage medium of claim 11, wherein said periodic generation of a signal to the computer system further comprises modifying the apparent oval shape of the virtual rubber band relative to a determined distance between the pointer element and the control icon.

20. The computer-readable storage medium of claim 11, wherein said step of displaying on said graphical user display a control icon further comprises displaying a slider bar control icon having two oppositional action areas and a virtual slider button, said virtual slider button being fixed in place and operable by said virtual rubber band.

21. A computer system for interfacing with a user, comprising:

(a) a graphical user display with a control icon displayed on said graphical user display, said control icon having one or more action areas, said action areas comprising at least one forward action area or one backward action area;

(b) a pointer controller operable by said user for positioning a pointer element on the graphical user display, the pointer controller having position and selection status responsive to operation by a user;

(c) a pointer position and selection status monitor for detecting when one of said action areas has been selected by said user; and (d) a virtual rubber band controller which alters the appearance of said control icon and said pointer element to visually indicate the selection of said action area by displaying a virtual rubber band on said graphical user display, said virtual rubber band encircling said action area and said pointer element; and (e) a signal generator for signaling said computer system in response to a continued selection by said user, said signal generator allowing repetitive operation of said action area while said selection is detected by autonomously repeatedly periodically generating a signal to said computer system.

22. The computer system of claim 21, wherein said forward action area comprises a button.

23. The computer system of claim 21, wherein said backward action area comprises a button.

24. Me computer system of claim 21, wherein said action areas comprise a slider action area.

25. The computer system of claim 24, wherein said backward action area comprises a scroll bar control button.

26. The computer system of claim 24, wherein said control icon comprises a virtual joystick action icon.

27. The computer system of claim 21, wherein said signal generator further comprises a rate adjuster for modifying the rate of periodic generation of a signal relative to a determined distance between the pointer element and the control icon.

28. The computer system of claim 21, wherein said signal generator further comprises a rubber band appearance adjuster for modifying the apparent thickness of the virtual rubber band relative to a determined distance between the pointer element and the control icon.

29. The computer system of claim 21, wherein said signal generator further comprises a rubber band appearance adjuster for modifying the apparent oval shape of the virtual rubber band relative to a determined distance between the pointer element and the control icon.

30. The computer system of claim 21, wherein said control icon displayed on said graphical user display further comprises a slider bar control icon having two oppositional action areas and a virtual slider button, said virtual slider button being fixed in place and operable by said virtual rubber band.

* * * * *

UNITED STATES PATENT AND TRADEMARK OFFICE
CERTIFICATE OF CORRECTION

PATENT NO. : 6,677,965 B1
DATED : January 13, 2004
INVENTOR(S) : Ullmann et al.

It is certified that error appears in the above-identified patent and that said Letters Patent is hereby corrected as shown below:

<u>Column 11</u>,
Line 5, change "Me" to -- The --
Lines 7 and 9, change "24" to -- 21 --

Signed and Sealed this

Sixth Day of April, 2004

JON W. DUDAS
*Acting Director of the United States Patent and Trademark Office*